United States Patent [19]

Scriven et al.

[11] Patent Number: 5,403,906
[45] Date of Patent: Apr. 4, 1995

[54] H2O2-CATALYZED SOLUTION POLYMERIZATIONS FOR LINEAR POLYVINYLPYRIDINES

[75] Inventors: Eric F. V. Scriven, Greenwood; James R. Stout, Brownsburg; James G. Keay; Ramiah Murugan, both of Indianapolis, all of Ind.

[73] Assignee: Reilly Industries, Inc., Indianapolis, Ind.

[21] Appl. No.: 142,708

[22] Filed: Oct. 25, 1993

[51] Int. Cl.$^6$ ............................ C08F 2/06; C08F 26/06
[52] U.S. Cl. ...................................... 526/212; 526/265
[58] Field of Search ............................... 526/212, 265

[56] References Cited

U.S. PATENT DOCUMENTS

| | | | |
|---|---|---|---|
| 3,673,168 | 6/1972 | Burke, Jr. et al. | 526/209 |
| 3,948,960 | 4/1976 | Burke, Jr. et al. | 526/335 |
| 4,957,984 | 9/1990 | Itoh et al. | 526/319 |
| 5,086,133 | 2/1992 | Itoh et al. | 526/93 |

*Primary Examiner*—Joseph L. Schofer
*Assistant Examiner*—N. Sarofim

[57] ABSTRACT

Described are preferred processes for producing linear polyvinylpyridines. The processes involve the use of hydrogen peroxide to initiate polymerization of vinylpyridine monomers in an alcohol/water solvent. Processes of the invention provide good reaction rates and conversions, and are particularly advantageous in achieving control of the $M_w$'s of the final product polymers.

24 Claims, No Drawings

H2O2-CATALYZED SOLUTION POLYMERIZATIONS FOR LINEAR POLYVINYLPYRIDINES

BACKGROUND OF THE INVENTION

The present invention resides generally in the field of polymers of vinylpyridines. More particularly, the present invention relates to solution polymerizations of vinylpyridine monomers to prepare linear vinyl pyridine polymers.

As further background, linear polyvinylpyridines and functionalized derivatives and copolymers thereof are useful in a wide variety of applications. For example, conductive polymers prepared from linear polyvinylpyridine and molecular iodine have been utilized as cathode materials in small solid-state batteries in which long life under low current strain is required, such as batteries used in implantable cardiac pacemakers. See, U.S. Pat. Nos. 3,660,163 (1972) and 3,773,557 (1973). Quaternary salts of polyvinylpyridines (e.g. poly(1-alkylvinylpyridinium halides)) have proven to be good negative electron beam resists for microlithography. See, K. I. Lee et al., Proc. SPIE Int. Soc. Opt. Eng., 333, 15 (1982).

Polyvinylpyridines have been used extensively in the repographic and lithographic fields because of the combination of properties ranging from adhesive to electrical properties. See, U.S. Pat. Nos. 4,041,204 (1977); 3,942,988 (1976); Ger. Offen. 3,040,047 (1981); Japan KOKAI 76 30,741 (1976); U.S. Pat. No. 4,032,339 (1977); Ger. Offen. 2,701,144 (1977); and Japan KOKAI 75 124,648 (1975). Polyvinylpyridines have also found applications in the film and photographic area. For example, solutions of polyvinylpyridine or their quaternary salts form thin films that protect the image surface of instant film prints. See, U.S. Pat. Nos. 2,874,045 (1959); 2,830,900 (1958); and 3,459,580 (1969).

Polyvinylpyridines are compatible with synthetic and natural polymers such as polyolefins (including polypropylene), polyethylene terephthalate, nylon, and cellulose, and thus find applications in plastics, alloys and blends. Fibers incorporating polyvinylpyridines show excellent dyeing intensity and are color fast [see, e.g. U.S. Pat. No. 3,361,843 (1968)] and polyvinylpyridiniumphosphate imparts permanent fire retardancy to cellulose textiles [see U.S. Pat. No. 2,992,942 (1961)] and thus polyvinylpyridines find uses in the textile industry as well.

Polyvinylpyridines further find utility in the treatment of bleached Kraft paper to increase titanium dioxide retention in pulp slurries, and electroplating applications (in particular quaternary salts), as corrosion inhibitors for metals including iron, aluminium, copper, brass, magnesium and solders, as polymerization inhibitors in Li/TiS$_2$ current-producing electrochemical cells, as emulsion stabilizers and dispersing agents (in particular acid salt and quaternary salt forms), as flocculating agents (particularly acid salt and quaternary ethylhalide forms), in ion exchange membrane preparation and many other applications. These and other uses for linear polyvinylpyridines are reviewed extensively in product literature available from Reilly Industries, Inc., Indianapolis, Ind. U.S.A., entitled "Linear Polyvinylpyridine: Properties and Applications" (1983 and 1989), to which reference can be made for additional information.

As to their preparation, linear polyvinylpyridines have been prepared by various general polymerization techniques. These have included radiation initiated, Ziegler-Natta initiated, free radical initiated and anionic initiated polymerizations. Radiation initiated polymerizations have usually been used for the preparation of graft copolymers. Ziegler-Natta initiated systems usually do not work well for the vinylpyridine systems.

Free radical (addition) polymerizations of vinylpyridines are common in the literature. Generally, there are three differing types of free radical catalyzed polymerizations, those being solution, emulsion and bulk. They are carried out more commonly using initiators such as benzoyl peroxide, cummene hydroperoxide and azobis (isobutyronitrile). Bulk polymerization of vinylpyridine catalyzed by benzoyl peroxide, hydrogen peroxide and certain other per compounds has been reported (French Pat. 849,126 (1939); CA:35:6358[6] (1941)), as has suspension polymerization of vinylpyridine catalyzed by water-soluble free radical initiator in the presence of small particles of solid polyolefin (U.S. Pat. Nos. 3,828,016, 3,947,526 and 4,824,910). Generally speaking, however, in known free radical-catalyzed processes it has often proven highly difficult to control the molecular weight of the vinylpyridine polymers using free radical initiators.

Anionic low temperature (−78° C.) homopolymerization of 4-vinylpyridine initiated with certain monofunctional alkalai-metal based carbanionic species have been studied in tetrahydrofuran and other solvent mixtures as reported by S. K. Varshney et al. in Macromolecules (26) 701 (1993). A significant disadvantage of this and other anionic polymerizations (see e.g. G. E. Molan et al., J. Polym. Sci. Part A-1, 4, 2336 (1966)) is the requirement of extreme dry conditions for the polymerizations which are directly related to the $M_w$ control of the product polymer. Thus, historically, anionic polymerizations of vinylpyridines have been somewhat difficult to control, making it complicated to obtain linear polyvinylpyridines of desired molecular weights, especially at lower molecular weights.

In addition to conventional polymerization methods, vinylpyridines have been reported to spontaneously polymerize upon salt formation with acids or alkyl halides. J. C. Salamone et al., Polymer Letters, 9, 13 (1971); I. Mielke et al., Macromol. Chem. 153, 307 (1972); J. C. Salamone et al, Macromolecules, 6, 475 (1973); J. C. Salamone et al., Polymer Letters, 15, 487 (1977). Such spontaneous polymerizations are relatively disadvantageous because they give rise to a mixture of the normal linear polyvinylpyridines and ionene type polymers.

In light of this background, there are needs for improved methods for polymerizing vinylpyridine monomers so as to achieve the production of linear polyvinylpyridines of controlled molecular weight. Such improved methods would also desirably be facile to conduct using readily available and inexpensive equipment and starting materials, while providing good reaction rates and product yields. The present invention addresses these needs.

SUMMARY OF THE INVENTION

One object of the invention is to provide a process for preparing linear polyvinylpyridine polymers which provides the ability to control the molecular weight of the polymer product.

Another object of the invention is to provide a process for preparing linear polyvinylpyridine polymers which provides molecular weight control without the need for utilizing extreme reaction conditions or large amounts of expensive catalysts.

Another object of the invention is to provide a process for preparing linear polyvinylpyridine polymers which provides high reaction rates to form the product polymers.

These and other objects are achieved by the preferred embodiments of the invention, one of which provides a process for producing a linear polyvinylpyridine which comprises reacting one or more vinylpyridine monomers in a solvent including alcohol and water in the presence of a catalytic amount of hydrogen peroxide, so as to polymerize the monomer or monomers to form a linear polyvinylpyridine polymer. This process allows relatively precise control of the molecular weight of the product polymer. Such molecular weight control can be achieved by varying the amount of hydrogen peroxide utilized, with higher amounts of hydrogen peroxide used in a given reaction system providing lower molecular weight polymers, and lower amounts of the hydrogen peroxide initiator providing higher molecular weight polymers. The alcohol/water solvent maintains both the vinylpyrdine monomer(s) and the product polymers in solution. Additionally, although the present invention is not limited by any theory, it is believed that the hydrogen peroxide acts as both initiator and as terminator either with or without the alcohol, leading to the control of product molecular weight. Moreover, because the initiator/terminator, hydrogen peroxide, is relatively inexpensive, control of the reactions to obtain low molecular weight linear polyvinylpyridines is achieved without incurring great expense, as may be the case with other, commonly used initiators. Further, processes of the invention provide unexpectedly high reaction rates, for instance being far superior to those obtained when using alcohol alone as the solvent.

Another preferred embodiment of the invention provides linear polyvinylpyridines which are producable and characterized by the preferred processes of the invention.

Additional objects, features and advantages of the invention will be apparent from the following description.

DESCRIPTION OF THE PREFERRED EMBODIMENT

For the purposes of promoting an understanding of the principles of the invention, reference will now be made to certain of its embodiments and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, the present invention provides a unique process for preparing linear polyvinylpyridines while controlling their molecular weight ($M_w$). The process involves reacting one or more vinylpyridine monomers in a solvent including alcohol and water in the presence of a catalytic amount of hydrogen peroxide, so as to polymerize the monomer or monomers to form a linear polyvinylpyridine polymer.

Preferred vinylpyridine monomers for use in the invention are 2- and 4-vinylpyridine monomers, although other vinylpyridine monomers, for example 3-vinylpyridine monomers, are suitable. The vinylpyridine monomer used in the invention can be obtained commercially or by techniques known to the art and literature, and can be non-substituted or substituted (i.e. on its pyridine ring) with one, two, three or four groups which do not detrimentally interfere with the polymerization reaction, especially lower alkyl groups such as $C_1$ to $C_6$ alkyls, i.e. methyl, ethyl, propyl, butyl, heptyl and hexyl substituents (see, e.g., Decout, J. L. et al., J. Prelim. Sci. Prelim. Chem,. Ed., 18, 2391 (1980)). More preferred vinylpyridine monomers are non-substituted 2- and 4-vinylpyridine monomers, for example as can be obtained from Reilly Industries, Inc., of Indianapolis, Ind., U.S.A. Although not necessary for the present invention, it is of course preferred that the vinylpyridine monomer(s) used be of high purity, for example 90% to 95% or more pure.

In general, preferred linear polyvinylpyridines produced in accordance with the invention will comprise repeating units of the formula:

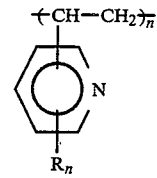

wherein n is 0 to 4 and R is a $C_1$ to $C_6$ alkyl group (in this definition, of course, each R may also differ from the other).

The amount of hydrogen peroxide initiator to use to obtain the desired product molecular weight will depend upon many factors including for example the particular reactants and solvent systems employed as well as their relative amounts (i.e. the concentration level of the reaction), and given the teachings herein will be readily determinable by the ordinarily skilled artisan. For example, as demonstrated in the Examples below, reactions run with equivalent amounts of hydrogen peroxide at higher concentrations (employing less of a given alcohol/water solvent relative to the vinylpyridine monomer(s)) will generally provide polymers of lower molecular weights, and vice versa.

In preferred processes of the invention, these parameters will be controlled to provide linear polyvinylpyridines having polystyrene equivalent $M_w$'s up to about 100,000, more preferably up to about 50,000, and most preferably up to about 30,000. In these preferred processes, the molar ratio of hydrogen peroxide to vinylpyridine monomer employed will usually be about 1:1 to about 1:1000. More preferably, this ratio will be about 1:1 to about 1:100, and most preferably about 1:1 to about 1:50. Likewise, preferred processes are conducted at concentration levels (i.e. (vinylpyridine monomer weight)/(vinylpyridine monomer weight+solvent weight)) of about 5% to about 50%.

The ratio of alcohol to water used can vary widely so long as the resulting solvent system maintains the vinylpyridine monomer(s) and polymer product in solution. This ratio will be readily determined by those practiced in the area. In preferred processes, the alcohol:water ratio will be in the range of 25:75 to about 95:5, more preferably about 40:60 to about 60:40.

Suitable alcohol solvents for use in the invention will be those which provide the necessary solvation of the reactants and products and which do not interfere with the polymerization reaction. Suitable such alcohols include water-miscible mono- or polyhydric aliphatic alcohols, generally having up to about 15 carbon atoms, especially lower alcohols (i.e. $C_1$ to $C_5$ alcohols such as methanol, ethanol, propanol, butanol, and pentanol (these including both branched and unbranched forms, e.g. n-, i- or t- forms of these alcohols). Preferred alcohols for use in the invention are lower alcohols such as $C_1$ to $C_4$ alcohols which have relatively low boiling points and are thus readily removed from reaction products by vacuum distillation, most preferably methanol, ethanol, n-propanol, i-propanol, n-butanol, t-butanol, and sec-butanol.

The polyvinylpyridines produced in accordance with the invention can also be functionalized for example including to acid salt forms, N-oxide forms, quaternary salt forms, and the like. The formed free-base form linear polyvinylpyridine polymers can be converted to these functionalized forms by conventional techniques, as discussed further below.

Processes of the invention will be conducted at temperatures sufficient to achieve the desired polymerization of the vinylpyridine monomer. Generally, the temperature of the polymerizations will vary with many factors including the particular monomer or monomers employed. Typically, however, when using preferred lower alcohols in the solvent system, the polymerization will be conducted at the reflux temperature of the alcohol/water solvent employed, for example preferably in the range of about 30° C. to about 100° C.

The hydrogen peroxide, reactants and solvents can be combined in any suitable manner to achieve the polymerization. The hydrogen peroxide can be added to the solvent/monomer mixture, the monomer may be added to the solvent/hydrogen peroxide mixture, or the hydrogen peroxide and monomer can be concurrently added to the solvent, or all can be charged concurrently. It is preferred to charge the hydrogen peroxide last, and then heat the reaction mixture to the desired temperature for the polymerization to occur.

The polymerization reaction will be continued for sufficient period of time to achieve substantial conversion of the vinylpyridine monomer(s) to the polymer product. The duration of the polymerization reaction required to achieve the conversion will depend upon several factors including the amount of hydrogen peroxide employed and the amounts and types of solvents and reactants employed. Typically, however, the polymerization reactions will be carried out over periods of up to about 24 hours, more typically about ½ to about 10 hours.

After the polymerization reaction is completed, the linear polyvinylpyridine polymer can be conventionally isolated. For example, the alcohol solvents can be removed by vacuum distillation, or the reacted medium can be contacted by a precipitation solvent in which the polyvinylpyridine is insoluble but in which the remainder of the reaction components are soluble. The polymer can then be filtered from the precipitation solvent. The use of suitable recovery and isolation techniques for the formed polymer is well within the purview of one of ordinary skill in the art.

The polymer is preferably recovered in substantially pure form (i.e. substantially free from other components of the reaction medium such as unreacted monomer, solvent or catalyst residues). Polymer compositions having narrow molecular weight distributions are also favored. Preferred polymer compositions of the invention will have polydispersities (defined as the weight average molecular weight of the polymer divided by the number average molecular weight of the polymer, $M_w/M_n$) in the range of about 1 to 10 and more preferably in the range of about 1 to 3.

The isolated linear polyvinylpyridines can be conventionally used and derivatized. For example, functionalized linear polyvinylpyridine polymers can readily be obtained. In this regard, as used herein the term functionalized includes both partially and substantially fully functionalized polymers. In most cases, linear polyvinylpyridine polymers are desired in which at least about 10%, more preferably at least about 50% of the pendant pyridine groups, are functionalized. Representative functional forms include acid salts forms, such as those prepared from strong mineral acids such as sulfuric acid or from hydrohalides such as hydrochloric acid. Quaternary salts can also be prepared by reacting the linear polyvinylpyridines with halogenated organics such as alkyl halides, usually $C_1$ to about $C_{10}$ alkyl halides. The linear polyvinylpyridines can be converted to their N-oxide forms by conventional procedures, for instance by reaction with hydrogen peroxide in the presence of acetic acid. See, e.g., the above-cited publication entitled "Linear Polyvinylpyridines: Properties and Applications" by Reilly Industries, Inc. The linear polyvinylpyridine can also form complexes with many metals or metal ligands, such as $Rh_4(CO)_{12}$, $Co_4(CO)_{12}$, $Co_2(CO)_8$ or Ru(II) or Rh(I).

To promote a further understanding of the present invention and its features and advantages, the following specific examples are provided. It is to be understood that these examples are illustrative and not limiting in nature. Unless indicated otherwise, $M_w$'s set forth herein are polystyrene equivalent $M_w$'s.

EXAMPLES 1–4

Preparations of Linear Polyvinylpyridines

General Procedure

Examples 1–4 set forth in Table 1 were conducted using the following procedure. To a 500 mL flask, equipped with a stirrer, thermometer, and reflux condenser, is charged 50 g (0.48 mole) 4-VP, 125 mL methanol, 125 mL water, and $H_2O_2$ (quantity depends on $M_w$ desired). The solution is heated to reflux and held until conversion to polymer is >90% (typically 2–10 hours). The polymer can be isolated by removing the solvents under vacuum. As these Examples demonstrate, variation of the $M_w$ of the final product is readily and effectively achieved by varying the ratio of $H_2O_2$ to vinylpyridine monomer. Additionally, excellent polydispersities ($M_w/M_n$) were obtained.

TABLE 1

| Example | Ex. 1 | Ex. 2 | Ex. 3 | Ex. 4 |
|---|---|---|---|---|
| 4-VP (moles) | 0.48 | 0.48 | 0.48 | 0.48 |
| $H_2O_2$ (moles) | 0.048 | 0.143 | 0.24 | 0.333 |
| $H_2O_2$:4-VP | 1:10 | 3:10 | 5:10 | 7:10 |
| Solvent | MeOH/$H_2O$ | MeOH/$H_2O$ | MeOH/$H_2O$ | MeOH/$H_2O$ |
| Solvent Amount (mL) | 125/125 | 125/125 | 125/125 | 125/125 |
| Temperature | reflux (82) | reflux (82) | reflux (82) | reflux (82) |
| Time (hrs) | 21 | 5 | 20 | 20 |
| Conversion (%) | | >70 | >75 | >70 |

TABLE 1-continued

| Example | Ex. 1 | Ex. 2 | Ex. 3 | Ex. 4 |
|---|---|---|---|---|
| Mw Main Peak | 14170 | 8349 | 4081 | 2677 |
| Mw/Mn Main Peak | 2 | 2.3 | 1.8 | 1.75 |

EXAMPLES 5-9

Additional Polymerizations at High Concentrations

Using the same general procedure as that set forth for Examples 1-4 above, except using 50 mL of methanol and 50 mL of water (instead of 125 mL each), the Examples set forth in Table 2 were carried out. These Examples demonstrate the capacity to carry out processes of the invention at higher concentration levels (about 35% in these instances) while still effectively achieving variation of end product $M_w$ and excellent polydispersities. Additionally, in general, these higher concentration runs provided products of lower $M_w$ than lower concentration runs (Examples 1-4) employing the same $H_2O_2$/monomer ratios.

TABLE 2

| Example | Ex. 5 | Ex. 6 | Ex. 7 | Ex. 8 | Ex. 9 |
|---|---|---|---|---|---|
| Equiv. $H_2O_2$ | 0.1 | 0.2 | 0.3 | 0.4 | 0.05 |
| Conversion by NMR | 95% | 93% | 84% | 85% | 96% |
| Mw | 8857 | 5008 | 3630 | 2910 | 22900 |
| Mw/Mn | 2 | 1.8 | 1.7 | 1.6 | 2.5 |

EXAMPLE 10

Use of Ethanol/Water Solvent

To a reaction flask equipped with a reflux condenser, thermometer, and stirrer was charged 50 g (0.48 mole) 4-vinylpyridine, 6.37 g (0.096 mole at 51.28%) hydrogen peroxide, 125 mL water and 125 mL ethanol. The reaction was heated to reflux (88° C.) and held for 5½ hours. NMR indicated greater than 90% conversion to polymer. A sample of the reaction solution was analyzed by GPC and found to have Mw=9500 and Mw/Mn=2.26.

EXAMPLE 11

Use of i-Propanol/Water Solvent

To a reaction flask equipped with a reflux condenser, thermometer, and stirrer was charged 50 g (0.48 mole) 4-vinylpyridine, 6.37 g (0.096 mole at 51.28%) hydrogen peroxide, 125 mL water and 125 mL i-propanol. The reaction was heated to reflux (85° C.) and held for 20 hours. NMR indicated greater than 90% conversion to polymer. A sample of the reaction solution was analyzed by GPC and found to have Mw=8000 and Mw/Mn=2.1.

EXAMPLE 12

Use of t-Butanol solvent

To a reaction flask equipped with a reflux condenser, thermometer, and stirrer was charged 28 g (0.27 mole) 4-vinylpyridine, 3.57 g (0.0315 mole at 30%) hydrogen peroxide, 70 mL water and 70 mL t-butanol. The reaction was heated to reflux (83° C.) and held for 20 hours. NMR indicated greater than 90% conversion to polymer. A sample of the reaction solution was analyzed by GPC and found to have Mw=9570 and Mw/Mn=2.3.

EXAMPLE 13

Polymerization of 2-Vinylpyridine

To a reaction flask equipped with a reflux condenser, thermometer, and stirrer was charged 50 g (0.48 mole) 2-vinylpyridine, 6.37 g (0.096 mole at 51.28%) hydrogen peroxide, 125 mL water and 125 mL methanol. The reaction was heated to reflux (82° C.) and held for 8 hours. NMR indicated approximately 75% conversion to polymer. A sample of the reaction solution was analyzed by GPC and found to have Mw=6800 and Mw/Mn=2.3.

EXAMPLE 14

Copolymerization of 2- and 4-Vinylpyridine

To a reaction flask equipped with a reflux condenser, thermometer, and stirrer was charged 50 g (25 g, 4-vinylpyridine and 25 g 2-VP, 0.48 mole) vinylpyridine, 6.37 g (0.096 mole at 51.28%) hydrogen peroxide, 125 mL water and 125 mL methanol. The reaction was heated to reflux (82° C.) and held for 24 hours. NMR indicated approximately 75% conversion to polymer. A sample of the reaction solution was analyzed by GPC and found to have Mw=5000 and Mw/Mn=1.88.

EXAMPLE 15

Polymerization of 4-Vinylpyridine

To a reaction flask equipped with a reflux condenser, thermometer, and stirrer was charged 50 g (0.48 mole) 4-vinylpyridine, 0.64 g (0.0096 mole at 51.28%) hydrogen peroxide, 125 mL water and 125 mL methanol. The reaction was heated to reflux (82° C.) and held for 5 hours. NMR indicated approximately 80% conversion to polymer. A sample of the reaction solution was analyzed by GPC and found to have Mw=30200 and Mw/Mn=1.9.

EXAMPLES 16-26

Preparations of Functionalized Linear Polyvinylpyridines

The functionalized linear polyvinylpyridines set forth in Table 3 can be prepared by reacting the free base form polyvinylpyridines of the indicated prior Examples with the indicated reagents.

TABLE 3

| Example | Polymer | Agent | Functional Form |
|---|---|---|---|
| 16 | Ex. 1 | Acetic Acid/$H_2O_2$ | N-oxide |
| 17 | Ex. 13 | Acetic Acid/$H_2O_2$ | N-oxide |
| 18 | Ex. 14 | Acetic Acid/$H_2O_2$ | N-oxide |
| 19 | Ex. 1 | HCl | HCl:Acid Salt |
| 20 | Ex. 13 | HCl | HCl:Acid Salt |
| 21 | Ex. 14 | $H_2SO_4$ | $H_2SO_4$:Acid Salt |
| 22 | Ex. 1 | Methyl Iodide | Quaternary Salt |
| 23 | Ex. 13 | Methyl Iodide | Quaternary Salt |
| 24 | Ex. 14 | Methyl Iodide | Quaternary Salt |
| 25 | Ex. 1 | Ethyl Iodide | Quaternary Salt |
| 26 | Ex. 13 | Ethyl Iodide | Quaternary Salt |

All publications cited herein are indicative of the level of ordinary skill in the art, and each is hereby incorporated by reference in its entirety as if individually incorporated by reference and fully set forth.

While the invention has been described in detail in the foregoing description, the same is to be considered as illustrative and not restrictive in character, it being understood that only the preferred embodiments have been described and that all changes and modifications that come within the spirit of the invention are desired to be protected.

What is claimed is:

1. A process for producing a linear polyvinylpyridine, comprising reacting one or more vinylpyridine monomers ill a solvent including alcohol and water in the presence of a catalytic amount of hydrogen peroxide at atmospheric pressure, so as to polymerize the monomer or monomers to form a linear polyvinylpyridine.

2. The process of claim 1 wherein the alcohol is a $C_1$ to $C_4$ aliphatic alcohol.

3. The process of claim 1 wherein the vinylpyridine monomer is 2-vinylpyridine, 4-vinylpyridine, or a mixture thereof.

4. The process of claim 1 wherein the polyvinylpyridine polymer has a $M_w$ of about 30000 or less.

5. The process of claim 1 wherein the alcohol and water are included in a ratio of about 60:40 to about 40:60, respectively.

6. The process of claim 2 wherein the alcohol is selected from the group methanol, ethanol, propanol or butanol.

7. The process of claim 6 wherein the alcohol is methanol.

8. The process of claim 6 wherein the vinylpyridine monomer is 2-vinylpyridine, 4-vinylpyridine, or a mixture thereof.

9. The process of claim 8 wherein the polyvinylpyridine has a molecular weight of about 30000 or less.

10. The process of claim 9 wherein the alcohol and water are included in a ratio of about 60:40 to about 40:60, respectively.

11. The process of claim 10 wherein the reacting occurs under refluxing conditions.

12. The process of claim 11 wherein the reacting is conducted for about 2 to about 10 hours.

13. The process of claim 12 which further comprises recovering said linear polyvinylpyridine.

14. The process of claim 13 wherein said recovering includes distilling off the alcohol.

15. The process of claim 14 wherein said distilling is under vacuum.

16. The process of claim 13 wherein the ratio of hydrogen peroxide to vinylpyridine monomer is about 1:1 to about 1:10.

17. A process for preparing a linear polyvinylpyridine, comprising:
forming a reaction mass by charging to a reactor an alcohol and water solvent, one or more vinylpyridine monomers, and hydrogen peroxide;
heating the reaction mass at atmospheric pressure to polymerize the vinylpyridine monomer(s) to form a linear polyvinylpyridine having a polydispersity of about 1 to about 3;
distilling the reaction mass to remove the alcohol and recover the linear polyvinylpyridine.

18. The process of claim 17 wherein the vinylpyridine monomer(s) is 2-vinylpyridine or 4-vinylpyridine or a mixture thereof.

19. The process of claim 18 which includes charging 2-vinylpyridine as the sole vinylpyridine monomer.

20. The process of claim 19 which includes charging 4-vinylpyridine as the sole vinylpyridine monomer.

21. The process of claim 19 which includes charging both 2-vinylpyridine and 4-vinylpyridine as the vinylpyridine monomers.

22. A polymerization process for preparing a linear polyvinylpyridine, comprising:
forming a reaction mass by charging to a reactor an alcohol and water solvent, one or more vinylpyridine monomers, and hydrogen peroxide; and
reacting the reaction mass to polymerize the vinylpyridine monomer(s) to form a linear polyvinylpyridine having a molecular weight of about 8000 to about 30000.

23. The process of 22 wherein the vinylpyridine monomer is 2-vinylpyridine, 4-vinylpyridine, or a mixture thereof, and said linear polyvinylpyridine has a polydispersity in the range of about 1 to about 3.

24. The process of claim 23 wherein the vinylpyridine monomer is 4-vinylpyridine.

* * * * *

UNITED STATES PATENT AND TRADEMARK OFFICE
CERTIFICATE OF CORRECTION

PATENT NO. : 5,403,906
DATED : April 4, 1995
INVENTOR(S) : Eric F. V. Scriven, et al It is certified that error appears in the above-indentified patent and that said Letters Patent is hereby corrected as shown below:

In claim 1 at column 9, line 9, please delete "ill" and insert in lieu thereof --in--.

Signed and Sealed this

Twenty-fifth Day of July, 1995

Attest:

BRUCE LEHMAN

Attesting Officer     Commissioner of Patents and Trademarks